No. 863,983. PATENTED AUG. 20, 1907.
F. GLETTY.
HARROW.
APPLICATION FILED DEC. 5, 1906.
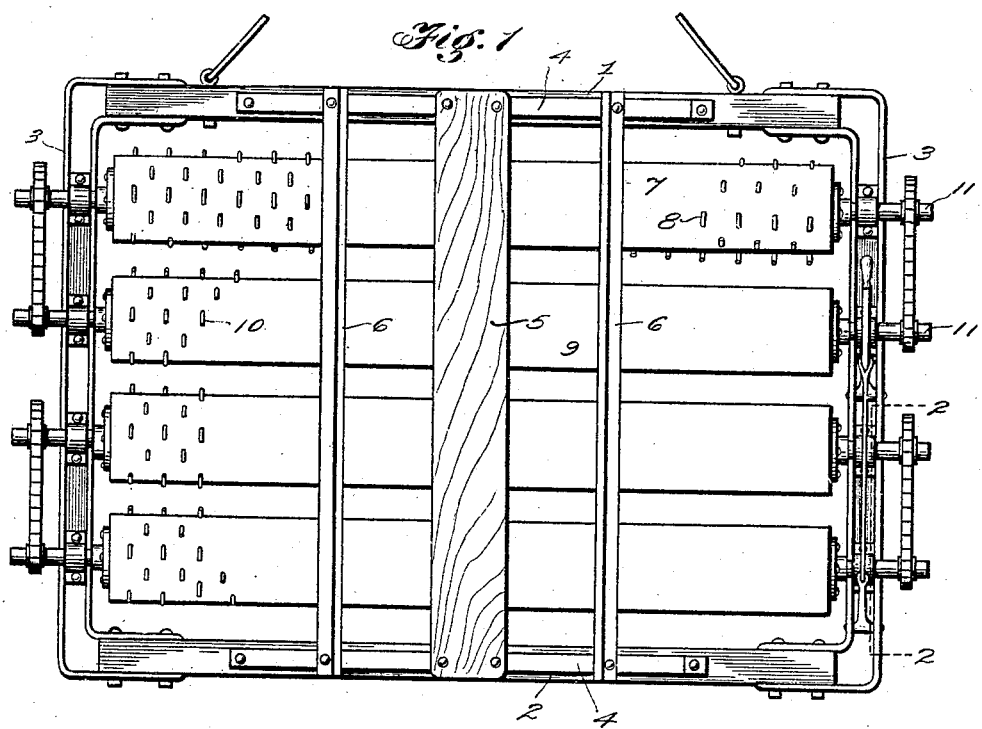
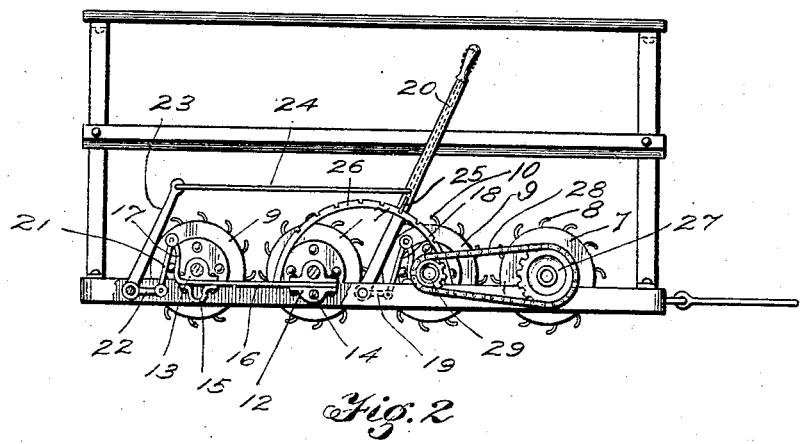
Witnesses
R. O. Claflin
C. C. Hines
Inventor
Fred Gletty
By Victor J. Evans
Attorney
THE NORRIS PETERS CO., WASHINGTON, D. C.

UNITED STATES PATENT OFFICE.

FRED GLETTY, OF SHERIDAN, ILLINOIS.

HARROW.

No. 863,983.

Specification of Letters Patent.

Patented Aug. 20, 1907.

Application filed December 5, 1906. Serial No. 346,496.

*To all whom it may concern:*

Be it known that I, FRED GLETTY, a citizen of the United States of America, residing at Sheridan, in the county of Lasalle and State of Illinois, have invented new and useful Improvements in Harrows, of which the following is a specification.

This invention relates to improvements in harrows, having for its object the production of an efficient construction of harrow of the roller or cylinder type whereby the clods of earth may be broken and thoroughly pulverized.

A harrow constructed in accordance with my invention is illustrated in the accompanying drawing, in which,—

Figure 1 is a top plan view of the harrow. Fig. 2 is a side elevation thereof, with a portion shown in longitudinal section on the line 2—2 of Fig. 1.

The frame of the harrow may be of any preferred construction, but in the form shown comprises front and rear transverse bars 1 and 2 connected by opposite sets or pairs of side irons 3, the irons of each pair being arranged in parallel relation and terminally bent and secured to the ends of the bars. Arched brackets 4 are supported upon the front and rear bars and carry a driver's seat board 5, on opposite sides of which are arranged brace bars 6 connecting the two brackets and serving as rests for the feet of the driver.

The frame carries pulverizing rollers arranged and operating in pairs, two of such pairs being shown in the present instance, although it will be understood that any desired number of pairs may be employed. These rollers extend transversely of the frame, and the forward roller 7 of each pair is provided with peripheral longitudinal rows or series of harrow teeth 8, which are curved forwardly or in the direction of rotation of said roller to sweep weeds and other trash rearwardly and prevent the same from clinging therein. The rear roller 9 of each pair is provided with harrow teeth 10 curved rearwardly or reversely to its direction of rotation, so that such teeth will toss the weeds or trash forwardly on the upward motion of the teeth and thus be freed therefrom. The rows of teeth upon both rollers are arranged in staggered relation, so that the teeth of each row come on lines between the teeth of the adjacent rows or, in other words, so that the teeth of the rows do not follow directly behind each other. By this arrangement of the teeth practically the entire surface of the roller is adapted to act upon the earth in such a manner that as one row of teeth moves out of contact with the earth the succeeding row will bigin to act thereon. The end journals 11 of the rolls 7 and 9 are respectively mounted in bearings 12 and 13, depending partially into the spaces between the pairs of side irons 3. The bearing 12 for each end of the roll 7 is pivotally mounted on a pin or bolt 14 fixed in the adjacent side irons, while the bearing 13 for each end of the roll 9 is free from connection with the frame and freely movable for the vertical adjustment of said roll, a guide piece 15 being suitably applied for movement in the space between the irons 3 to guide the bearing in its movements.

A bar 16 connects each set of bearings 12 and 13 and is provided with an upwardly bent rear end 17. The end 17 of the connecting bar of one of the sets of bearings for the front pair of rollers of the two pairs shown is connected by a link 18 with a crank arm 19 on a main adjusting lever 20 pivoted to the frame, while the bent end 17 of the adjacent bar of the bearings of the rear pair of rolls is connected by a link 21 with a crank arm 22 on a second lever 23 coupled to the lever 20 by a connecting rod 24, so that both levers may be adjusted in unison. The lever 20 is provided with a pawl 25 to engage a rack 26 on the frame, whereby the two levers may be locked in a variety of adjusted positions.

Fixed to the ends of the rolls 7 are sprocket wheels 27 connected by chains 28 with sprocket pinions 29 on the coöperating rolls 9. The pinions are preferably of about one-half the diameter of the sprocket wheels, so that the roller 7 acting as the driver roller may rotate the roller 9 at an increased rate of speed with respect thereto.

It will be apparent from the foregoing description that by the construction of the adjusting mechanism the rear rollers may be elevated out of contact with the ground or so that their teeth will but lightly touch the ground, to adapt the harrow to be transported from place to place with diminished strain on the draft animals or to vary the working relation of the rollers as occasion may require. The rollers of each pair rotate in the same direction, and owing to the variable sizes of the sprocket wheel it will be understood that when the teeth of both rollers penetrate the ground to the same extent, the tendency of the gearing will be to check the action of one roll and produce a relatively sliding motion of the other roll, thus causing the front roll to push the dirt rearwardly and the rear roll to push it forwardly, whereby the earth, by thus being tossed back and forth and ground by such action of the rolls, will be thoroughly threshed, as it were, and pulverized. This action of the rolls may be regulated to any desired degree by raising or lowering the rear rolls so that their teeth will penetrate to a greater or less extent into the ground and regulate by their resistance the speeds of rotation and grinding motion of the rolls. Hence it will be seen that by the described construction and arrangement of the teeth and gearing the rolls will operate to break up and pulverize the soil in a thorough manner.

Having thus described the invention, what is claimed as new, is:—

1. A harrow comprising a frame, a pair of rolls provided with pulverizing teeth, bearings for the front roll pivotally mounted on the frame, bearings for the second roll connected with the first named bearings for movement therewith in the arc of a circle on the pivots thereof, whereby the rear roll may be adjusted with respect to the ground surface, gearing between the two rolls operative to rotate the rolls at different rates of speed, and means for swinging the bearings to adjust the rear roll with respect to the surface of the ground.

2. A harrow comprising a frame having spaced side pieces, a pair of rolls provided with pulverizing teeth, bearings for the front roll pivotally mounted between the spaced side pieces, bearings for the second roll having guides to move down between said side pieces, said bearings being connected with the first named bearings for vertical adjustment in the arc of a circle on the pivots thereof, gearing between the two rolls operative to rotate the rolls at different rates of speed, and means for swinging the bearings to adjust the rear roll with respect to the ground.

3. A harrow comprising a frame, bearings pivotally supported upon the frame and having rearwardly extending arms, a front pulverizing roll journaled in said bearings, bearings upon the free ends of the arms, a rear pulverizing roll journaled in said bearings, and means for raising and lowering the arms to swing the same on the pivots of the front bearing to adjust the rear roll with respect to the ground surface.

4. A harrow comprising a frame, front and rear pairs of rolls provided with pulverizing teeth, bearings for the front roll of each pair pivotally mounted on the frame, bearings for the second roll of each pair radially connected with the first named bearings for movement therewith in the arc of a circle on the pivots thereof, whereby the rear roll may be adjusted with respect to the ground surface, gearing between the rolls of each pair operative to rotate said rolls at different rates of speed, and adjusting means for simultaneously swinging the bearings of both sets of rolls.

In testimony whereof, I affix my signature in presence of two witnesses.

FRED GLETTY.

Witnesses:
C. H. WHITE,
H. G. HUPP.